G. H. NAYLOR.
PIPE CLAMP.
APPLICATION FILED JUNE 10, 1915.

1,169,670.

Patented Jan. 25, 1916.

WITNESSES
Frank C. Palmer.

INVENTOR
George H. Naylor
BY
ATTORNEYS

UNITED STATES PATENT OFFICE.

GEORGE H. NAYLOR, OF NEVADA, MISSOURI.

PIPE-CLAMP.

1,169,670.          Specification of Letters Patent.     Patented Jan. 25, 1916.

Application filed June 10, 1915. Serial No. 33,290.

*To all whom it may concern:*

Be it known that I, GEORGE H. NAYLOR, a citizen of the United States, and a resident of Nevada, in the county of Vernon and State of Missouri, have invented a new and Improved Pipe-Clamp, of which the following is a full, clear, and exact description.

My invention relates to pipe clamps, and has reference more particularly to a flexible pipe clamp which comprises a flexible member adapted to encompass pipes of different diameters, with means for gripping or releasing the flexible member from the device.

The object of the invention is to provide a light, strong, efficient, and inexpensive pipe clamp or vise of flexible nature which will occupy little space, so that the same can be utilized particularly for clamping the bell end of a cast soil pipe while the joint therein is calked to prevent the bell end from splitting.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1:
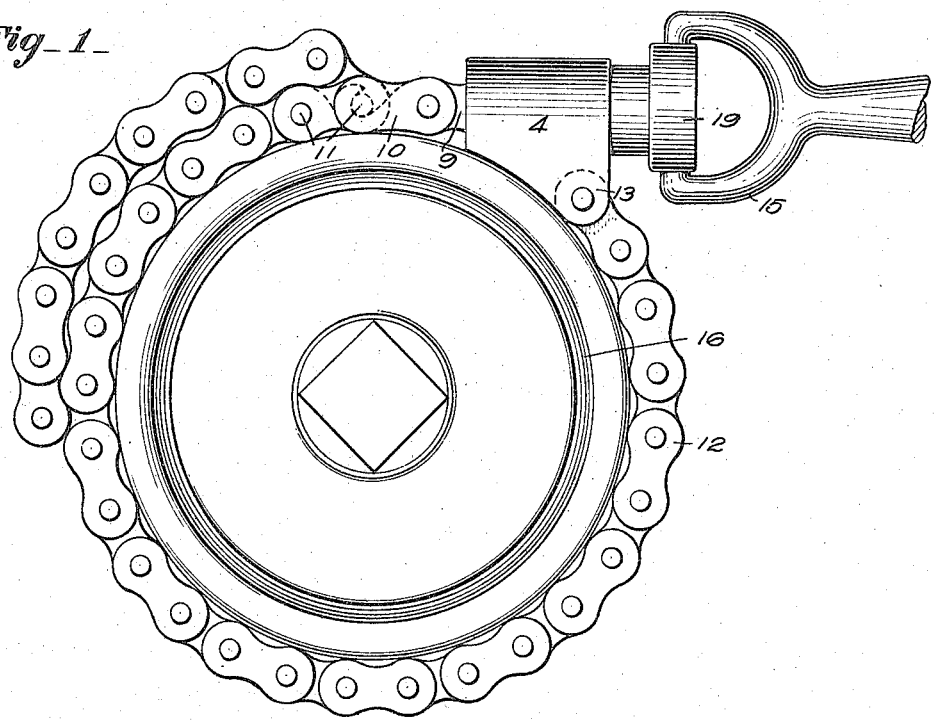
Figure 2:
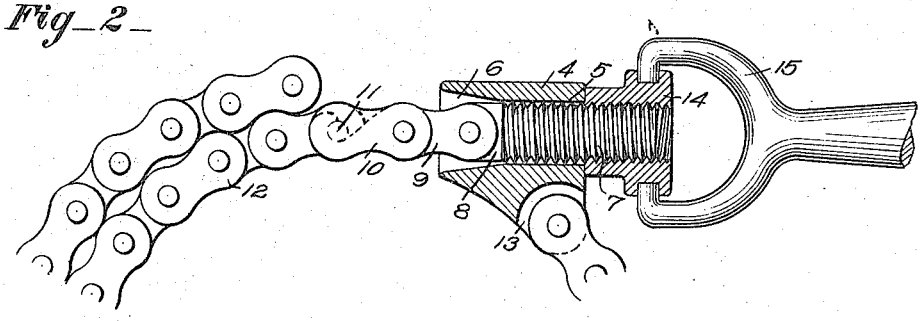
Figure 3:
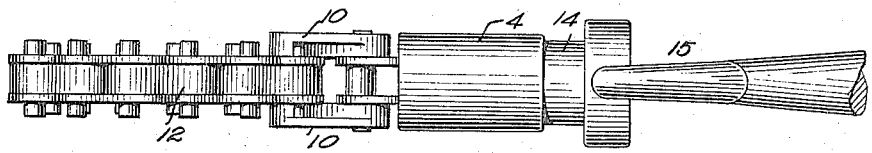

Figure 1 is an elevation of the bell end of a pipe clamped by means of my tool; Fig. 2 is a similar view showing the head of the clamp in section; and Fig. 3 is a top view of the tool.

My tool is mainly intended as a clamp for gripping the tubular portion of a pipe to prevent the expansion thereof when pressure is applied to the inner surface of the pipe. The particular application of the tool is for preventing the spreading of tubes where the joints are calked. As shown in the drawings, the tool comprises a head 4 which has a central bore 5 the enlarged end 6 of which is angular in cross section. Fitting into the bore 5 is a threaded bolt 7 the head 8 of which is within the portion 6 of the bore. Secured to the head 8 is a link 9 carrying reinforced hooks 10 adapted to engage the pins 11 of the chain 12, one end of which chain is secured to an extension 13 of the head 4.

Threaded on to the bolt 7 is a nut 14 to which is secured a swinging handle 15 whereby the bolt can be moved within the bore 5 to increase or decrease the diameter of the circle formed by the chain 12 connected to the hooks 10 whereby a pipe is either engaged or disengaged by the tool. The engagement of the link 9 with the portion of the bore 6 prevents the bolt 7 from turning when the nut 14 is turned by means of the handle 15.

When the joint of an earth pipe is to be calked, the tool is made to engage the bell end of the pipe by simply applying the head 4 against the bell, encircling the bell with the chain and engaging the hook 10, as shown. The nut 14 is then turned by means of the handle 15 to grip the bell tightly. The joint 16 can then be calked without any danger that the bell of the tube will expand and give.

It is self-evident that my clamp can be used for any other similar purposes where the spreading of a tube is to be prevented while work is performed thereupon.

I claim:

A pipe clamp comprising a head having a longitudinal bore a portion of which is enlarged and of angular cross section, a chain connected to said head, a bolt in the bore of the head having its head within the enlarged portion of the bore, a hook pivotally connected to the head of the bolt, said chain having means adapted to be engaged by the hook, a nut engaging the bolt and a swinging handle engaging the nut for turning the same, whereby the bolt is moved within the head, substantially as and for the purpose set forth.

In testimony whereof I have signed my name to this specification in the presence of two subscribing witnesses.

GEORGE H. NAYLOR.

Witnesses:
 WM. F. STERETT,
 WOODDY SWEARINGEN.

Copies of this patent may be obtained for five cents each, by addressing the "Commissioner of Patents, Washington, D. C."